Patented Oct. 10, 1950

2,525,145

UNITED STATES PATENT OFFICE 2,525,145

SUPPORTED PHOSPHORIC ACID-BORIC ACID CATALYST AND ITS MANUFACTURE

Julian M. Mavity, Hinsdale, Ill., assignor to Universal Oil Products Company, Chicago, Ill., a corporation of Delaware No Drawing. Application October 29, 1948, Serial No. 57,406

8 Claims. (Cl. 252—432)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing a hydrocarbon conversion catalyst which has a high crushing strength after use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid, a siliceous adsorbent, and a member of the group consisting of boric acid and its anhydride, drying and calcining the resultant mixture.

Another embodiment of this invention relates to a process for manufacturing a solid catalyst which comprises mixing a polyphosphoric acid, a siliceous adsorbent, and a member of the group consisting of boric acid and its anhydride, drying and calcining the resultant mixture.

A further embodiment of this invention relates to a process for manufacturing a solid catalyst which comprises mixing a polyphosphoric acid, siliceous adsorbent, and a member of the group consisting of boric acid and its anhydride to form a composite, shaping said composite into particles, drying and calcining said particles.

A still further embodiment of this invention relates to a process for manufacturing a solid catalyst which comprises mixing pyrophosphoric acid, diatomaceous earth, and a member of the group consisting of boric acid and its anhydride to form a composite, shaping said composite into particles, drying and calcining said particles.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, orthophosphoric acid ($H_3PO_4$) and pyrophosphoric acid ($H_4P_2O_7$) find application in the primary mixtures, due partially to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reaction as each of the catalysts produced from different acids and by slightly varied procedure will exert its own characteristic action.

In using ortho-phosphoric acid as a primary ingredient, different concentrations of the aqueous solution may be employed from approximately 75 to 100% or acid containing some free phosphorus pentoxide may even be used. (By this is meant that the ortho acid may contain a definite percentage of the pyro acid corresponding to the primary phase of dehydration of the orthophosphoric acid.) Within these concentration ranges, the acids will be liquids of varying viscosities and readily incorporatable with adsorbent materials. In practice, it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures may be different from that employed with the ortho acid.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric acid is added gradually (while absorbing heat of reaction) until it amounts to 52% of the total water present. After a considerable period of standing at ordinary temperatures, the crystals of the tetraphosphoric acid separate from the viscous liquid and it is found that these crystals melt at approximately 93° F. and have specific gravity of 1.1886 at a temperature of 60° F. However, it is unnecessary to crystallize the tetraphosphoric acid before employing it in the preparation of the solid catalyst inasmuch as the crude tetraphosphoric acid mixture may be incorporated with the siliceous adsorbent and boric acid or boric anhydride.

The materials which may be employed as adsorbents or carriers for phosphoric acid and a member of the group consisting of boric acid and its anhydride are predominantly of siliceous character and include diatomaceous earth, kieselguhr, artificially prepared silica, and certain members of the class of aluminum silicates including such naturally occurring substances as various fuller's earth and clays, such as bentonite, montmorillonite, acid-treated clays and the like. Each adsorbent or supporting material which may be used alternately or in admixture with one another will exert its own specific influence upon the effectiveness of the catalyst composite which will not necessarily be identical with other members of this class of siliceous materials.

The catalyst of this process is formed by compositing the phosphoric acid, siliceous adsorbent, and boric acid or its anhydride in the proportions of from about 60 to about 80% by weight of a phosphoric acid and from about 20 to about 40% by weight of a solid comprising from about 80 to about 20% by weight of a siliceous adsorbent and from about 20 to about 80% of a compound selected from the members of the group consisting of boric acid and its anhydride. A convenient method of making such a composite catalyst is to mix from 20 to 80% by weight of boric acid or its anhydride with from 80 to 20% by weight of diatomaceous earth or some other siliceous adsorbent and then to composite from about 1 to 2 parts by weight of this solid mixture with from 3 to 4 parts by weight of a phosphoric acid to form the composite which is then calcined to form the finished catalyst.

Catalysts of this process may be prepared from an acid of phosphorus such as orthophosphoric acid, pyrophosphoric acid, triphosphoric acid, or tetraphosphoric acid, a siliceous adsorbent, and a member of the group consisting of boric acid and its anhydride, by the successive steps of mixing the boric acid or its anhydride with the siliceous material and thereafter mixing the phosphoric acid with the finely divided solids, either at atmospheric temperature such as above 70° F. or at an elevated temperature in the approximate range of 250° to 450° F. to form a paste (the acid ordinarily being in major proportion by weight). The resultant paste formed from the phosphoric acid, siliceous adsorbent, and boric acid or its anhydride, is then formed into shaped particles by extrusion or other suitable means and the resultant particles are then dried at a temperature of from about 350° to about 500° F. to form a substantially solid material which is then calcined further at a temperature generally of from about 500° to about 1000° F. Granular catalysts may also be formed by subjecting the paste to drying and calcining procedures without preliminary extrusion. In this case, the dried and calcined catalyst is in the form of large lumps or pieces which are then subjected to crushing and screening treatment in order to obtain a granular catalyst, preferably of from about 4 to about 20 mesh size.

The calcination treatment may be carried out by heating the dried catalyst mixture in a substantially inert gas, such as air, nitrogen, and the like. The resultant catalyst which has been calcined is active for polymerizing olefinic hydrocarbons, particularly for polymerizing normally gaseous olefinic hydrocarbons to form normally liquid olefin hydrocarbons suitable for use as constituents of gasoline.

It should be pointed out that the calcined catalyst formed from phosphoric acid, a siliceous absorbent and boric acid or its anhydride has the quality of retaining its high activity for a longer time than has been observed previously with similar catalysts prepared from phosphoric acid and a siliceous adsorbent in the absence of the mentioned boron compounds. The presence of the boron compound in the catalyst composite has a stabilizing action on the activity of the catalyst when exposed to high calcination temperature or high operating temperature. Such catalysts may be overheated locally during olefin polymerization without losing polymerizing activity to any substantial extent. Also, the higher calcination temperatures that can be used with catalysts containing boron compounds have the advantage in giving higher structural strength to the resultant calcined catalyst. Not only is the original strength of the catalyst highly important but its strength after use in polymerizing olefins such as in polymerizing propylene is highly important as this is a determining factor in the effective life of the catalyst. Ordinarily the solid phosphoric acid catalyst does not lose much of its activity during use but the termination of a particular polymerization run is determined by the catalyst strength, for if the catalyst is of low structural strength, the catalyst tower eventually becomes obstructed by catalyst fines and reaction products, so that it is necessary to discontinue the run.

When employed in the conversion of olefinic hydrocarbons into polymers, the calcined catalyst formed as herein set forth is preferably employed as a granular layer in a heated reactor, which is generally made from steel, and through which the preheated hydrocarbon fraction is directed. The solid catalyst of this process may thus be employed for treating mixtures of hydrocarbon vapors to effect olefin polymerization, but this same catalyst may also be used at operating conditions suitable for maintaining liquid phase operation during polymerization of olefinic hydrocarbons, such as butylenes, to produce gasoline fraction. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure slightly superatmospheric to about 1500 pounds per square inch and preferably within the range of 100 to about 300 pounds per square inch when dealing with olefin-containing materials such as stabilizer reflux which may contain from approximately 10 to 50% or more of propylene and butylenes. When operating on a mixture comprising essentially butanes and butylenes, this catalyst is effective at conditions favoring the maximum utilization of both normal butylenes and isobutylene which involves mixed polymerization at temperatures of from approximately 275° to about 325° F. and at pressures of from about 500 to about 1500 pounds per square inch.

In utilizing the catalyst of this invention for promoting miscellaneous organic reactions, the catalyst may be employed in essentially the same way as it is used when polymerizing olefins, in case the reactions are essentially vapor phase and it may be employed in suspension also in liquid phase in various types of equipment.

With suitable modifications in the details of operation, the present time of catalyst may be employed in a large number of organic reactions including polymerization of olefins, as already mentioned. Typical cases of reactions in which the present type of catalyst may be used are the alkylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc. Reactions involving the hydrohalogenation of unsaturated organic compounds, isomerization reactions, ester formation by the interaction of a carboxylic acid and an olefin, and the like. The specific procedure for utilizing the present type of catalyst in miscellaneous organic reactions will be determined by the chemical and physical characteristics and the phase of the reacting constituents.

During use of the catalyst of this process in vapor phase polymerizations and other vapor phase treatments of organic compounds, it is advisable to add small amounts of moisture to prevent excessive dehydration and subsequent decrease in catalyst activities. In order to substantially prevent loss of water from the catalyst, an amount of water or water vapor such as steam is added to the charging stocks so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use. I have found, however, that catalysts of good crushing strength may be produced by compositing with the phosphoric acid and diatomaceous earth or other siliceous adsorbent, a certain amount of boric acid or its anhydride as indicated herein. Such a catalyst containing boric oxide or boric acid together with a phosphoric acid and a siliceous adsorbent also has a good crushing strength after use in the polymerization reaction. Pyrophosphoric acid-diatomaceous earth catalysts to which boric acid or boric oxide has been added during the preparation and the resultant composite has been dried and calcined have been found to form resultant catalysts having a high crushing strength. The catalysts have then been used in converting propylene into propylene polymers in rotatable steel autoclaves and also in continuous operation in a tubular reactor and found to retain a good crushing strength after such polymerization use in which from about 65 to about 75% of the propylene charged was converted into liquid products.

The strength of the solid catalyst formed by this process from phosphoric acid, a siliceous adsorbent, and a member of the group consisting of boric acid and its anhydride is also increased by incorporating with the catalyst composite during its preparation a small amount generally not over about 10% and preferably 0.5 to about 5% by weight of carbonaceous material as hereinafter set forth or of a compound preferably an oxide or salt of a metal selected from the metals of groups II, III, and IV of the periodic table. Suitable carbonizable organic materials, that is, carbonaceous materials that may be incorporated in the catalyst prior to the forming of the particles and which are then calcined in a non-oxidizing atmosphere include carbohydrates such as starches and sugars, flours, gelatin, glue, asphalts, cracked residues, difficultly volatile or non-volatile organic compounds of silicon, boron or phosphorus, such as silicones, alkyl or aryl orthosilicate, tricresylphosphate, etc. Also some carbonaceous materials may be introduced into the preformed catalyst particles by high temperature treatment at controlled conditions with organic materials of a type which readily produce a deposit of desired characteristics. Unsaturated materials are highly effective, such as olefinic hydrocarbons, or mixtures of olefins with saturated hydrocarbons can also be employed at properly controlled conditions which include temperatures higher than those ordinarily used for the polymerization process. Also preformed catalyst particles may be soaked in or impregnated with a decomposible organic liquid or a solution (either aqueous or non-aqueous) containing suitable organic material and subsequently calcined in a non-oxidizing atmosphere.

The structural stability of catalyst formed by this process from a phosphoric acid, a siliceous adsorbent, and a boric acid or its anhydrides, may also be increased by incorporating in the mixture of the aforementioned constituent, a controlled proportion, generally not over 10% and preferably from about 0.5 to about 5% by weight of an oxide, hydroxide, or salt of a metal selected from the metals of groups II, III and IV of the periodic table. The metals from group II preferred include magnesium, calcium, strontium, barium, zinc and cadmium from group III is aluminum and from group IV are the metals titanium, zirconium, thorium, tin and lead. These salts may include chlorides, silicates, borates, phosphates, as well as salts of organic acids including carbonates. These substances may be introduced into the catalyst by either of the following two methods: (1) They may be incorporated in the catalyst mechanically prior to the forming of the particles which are subsequently calcined. (2) Preformed catalyst particles may be soaked in or impregnated with a solution of those substances which are soluble and the impregnated particles are then calcined.

The following examples of the preparation of catalyst comprised within the scope of this invention and results obtained in their use for catalyzing the polymerization of propylene are characteristic although the exact details set forth are not to be misconstrued as imposing undue limitations upon the generally broad scope of the invention.

Catalyst compositions have been expressed on the weight of the materials used in their preparation as weight per cent phosphoric acid, that is, orthophosphoric acid, and weight per cent of supporting material, the latter consisting of definite mixtures of boric acid and diatomaceous earth. In the runs shown in the following table, the orthophosphoric acid contents were 60, 70, and 80% and four different supporting mixtures ranging in 20% increments from 20 to 80% $H_3BO_3$. The diatomaceous earth contents have been expressed on a volatile matter-free basis.

TABLE I

*Propylene polymerization tests on solid catalyst produced from phosphoric acid, diatomaceous earth, and boric acid*

Test conditions: 10 g. catalyst 100 g. Propane-Propylene feed (53.1–55.5 mole percent $C_3H_6$), 2 hrs. at 450° F. (232° C.) in 850 cc. rotating autoclave.

| Run No. | Catalyst Description [1] | | | Percent Conv. of $C_3H_6$ | Average Crushing Strength, lbs. | |
|---|---|---|---|---|---|---|
| | Weight Percent of Phosphoric acid | $H_3PO_4$-Free Basis Weight Percent of $H_3BO_3$ | Weight Percent of Diatomaceous Earth [2] | | Before Test | After Test |
| 60% $H_3PO_4$, SERIES B—CALCINATION 1 HR. @ 680° F. | | | | | | |
| 1 | 60 | 0 | 100 | 10.5 | 20.5 | 10.7 |
| 2 | 60 | 20 | 80 | 6.5 | 23.9+ | 23.4+ |
| 3 | 60 | 40 | 60 | 12.0 | 19.5 | 23.7+ |
| 4 | 60 | 60 | 40 | 13.5 | 25.2+ | 26.5+ |
| 5 | 60 | 80 | 20 | 21.0 | 23.1+ | 22.4+ |
| 6 | 60 | 100 | 0 | 10.5 | 10.3 | 9.6 |
| 60% $H_3PO_4$, SERIES C—CALCINATION 1 HR. @ 860° F. | | | | | | |
| 7 | 60 | 0 | 100 | 1.5 | 26.8+ | 26.6+ |
| 8 | 60 | 20 | 80 | 2.5 | 24.9+ | 26.9+ |
| 9 | 60 | 40 | 60 | 7.0 | 26.1+ | 25.5+ |
| 10 | 60 | 60 | 40 | 14.5 | 26.0+ | 26.9+ |
| 11 | 60 | 80 | 20 | 18.0 | 26.5+ | 25.1+ |
| 12 | 60 | 100 | 0 | 17.0 | 16.4 | 14.3 |
| 70% $H_3PO_4$, SERIES B—CALCINATION 1 HR. @ 680° F. | | | | | | |
| 13 | 70 | 0 | 100 | 45.0 | [3]16.0 | 21.3+ |
| 14 | 70 | 0 | 100 | 41.5 | 17.0 | 13.2 |
| 15 | 70 | 20 | 80 | 44.0 | 24.6+ | 24.7+ |
| 16 | 70 | 40 | 60 | 36.5 | 22.5+ | 20.1 |
| 17 | 70 | 60 | 40 | 44.5 | 24.5+ | 23.6+ |
| 18 | 70 | 80 | 20 | 30.5 | 24.8+ | 19.6 |
| 19 | 70 | 100 | 0 | 85.5 | 6.4 | 1.8 |
| 70% $H_3PO_4$, SERIES C—CALCINATION 1 HR. @ 860° F. | | | | | | |
| 20 | 70 | 0 | 100 | 11.5 | 25.0+ | 26.6+ |
| 21 | 70 | 0 | 100 | 14.0 | 25.4+ | 26.2+ |
| 22 | 70 | 20 | 80 | 52.5 | 25.9+ | 26.4+ |
| 23 | 70 | 40 | 60 | 51.0 | 22.2 | 20.1 |
| 24 | 70 | 60 | 40 | 32.0 | 26.5+ | 23.5+ |
| 25 | 70 | 80 | 20 | 71.0 | 26.6+ | 26.0 |
| 26 | 70 | 100 | 0 | 81.5 | 9.5 | 6.6 |
| 80% $H_3PO_4$, SERIES B—CALCINATION 1 HR. @ 680° F. | | | | | | |
| 27 | 80 | 0 | 100 | 51.0 | 7.3 | 4.9 |
| 28 | 80 | 20 | 80 | 56.0 | 11.3 | 10.5 |
| 29 | 80 | 40 | 60 | [4]64.0 | 16.5 | 13.4 |
| 30 | 80 | 60 | 40 | 47.5 | 12.1 | 8.6 |
| 31 | 80 | 80 | 20 | 64.0 | 5.7 | ca.0 |
| 32 | 80 | 100 | 0 | (Too sticky for testing) | | |

[1] 3/16" pills, formed in molds.
[2] Volatile matter free basis.
[3] Subsequent determination showed 18.5.
[4] Gas sample lost; conversion estimated from correlation between liquid yield and conversion calculated from gas analyses.

The different solid catalysts prepared from phosphoric acid, diatomaceous earth, and boric acid or boric oxide were tested for polymerizing activity on propylene. In these catalyst activity tests, a sample of 10 grams of 5 x 5 mm. pellets of the catalyst and 100 grams of a propane-propylene mixture (50–55% propylene content) were placed in a rotatable steel autoclave of 850 cc. capacity and rotated at a temperature of 450° F. for 2 hours. At the end of this time, determinations were made to indicate the per cent conversion of propylene into liquid polymers, these determinations being by means of gas analysis of the residual gas.

Although orthophosphoric acid was employed in the production of the catalyst referred to in the foregoing example, other acids of phosphorus may also be used. When the other acids of phosphorus are so employed, the proportions of starting materials are regulated so as to have in the resulting composite of phosphoric acid, diatomaceous earth, and boron compound, about the same weight ratios of $P_2O_5$—$SiO_2$—$B_2O_3$ as the catalyst prepared from orthophosphoric acid, diatomaceous earth, and boric acid. In other words, the different catalyst mixtures will contain about the same corresponding atomic ratios of phosphorus, silicon, and boron.

The improvement in crushing strength of these catalysts containing both boric acid and diatomaceous earth in admixture with phosphoric acid is evident on comparison with the crushing strength of phosphoric-diatomaceous catalysts having about the same phosphoric acid content. Thus a commercially prepared phosphoric acid-diatomaceous earth catalyst analyzing 62% $P_2O_5$ had a crushing strength of 11.4 pounds when fresh and a crushing strength of 5.4 pounds after the activity test on propane-propylene mixture in the autoclave run which showed a polymerizing activity of 55%. Another sample of this commercially prepared catalyst after further calcination at a temperature of 860° F. for one hour gave 48.5% polymerization of propylene, had a crushing strength of 16 pounds when fresh and an after-use crushing strength of 9.1 pounds.

The volatile matter content of the diatomaceous earth used in the preparation of the foregoing catalysts was determined by calcining this material over a Meker burner at red heat. According to this procedure, the volatile matter content was 10.45%.

The amounts of materials used in preparing catalysts shown in the foregoing table, the calculated composition and some of the properties are listed in Table 2. The general procedure was similar for each preparation. The starting materials were intimately mixed. The indicated amounts of water were added for one of two purposes. In some cases, the mixtures were too dry and required some water to give a workable paste for pelleting. In most cases, water was added to effect solution of the boric acid in an attempt to eliminate flakes of this material which had some tendency to remain as flakes in the final paste. This procedure was not totally effective since crystals separated usually during subsequent evaporation. The mixtures were evaporated with intermittent stirring under an infra-red lamp until the resulting paste appeared to be of suitable consistency for pilling. The paste was then pressed into 3/16" holes in steel pill-plates, and these were heated at a temperature of 392° F. in an oven until the pills could be punched out readily without deforming the pills. The heating time in the pill-plate molds was usually about 30 minutes but was varied in a few cases where the thirty minutes heating introduced difficulties. After removal from the molds, the pills were further heated in an oven to give a total time of about one hour at 392° F. after which they were calcined in open clay crucibles in a muffle furnace.

TABLE II
*Preparation and properties of $H_3BO_3$ diatomaceous earth-$H_3PO_4$ catalyst series*

| Catalyst No. | Starting Materials | | | | Composition by Preparation | | | Series | | Series C | |
|---|---|---|---|---|---|---|---|---|---|---|---|
| | | | | | | $H_3PO_4$—Free Basis | | Calcined 1 hr. @ 680° F. | | Calcined 1 hr. @ 860° F. | |
| | $H_3BO_3$ | Diatomaceous Earth | $H_3PO_4$ (85.7% assay) | $H_2O$ | Per Cent $H_3PO_4$ | Per Cent $H_3BO_3$ | Diatomaceous Earth (VM-free) | ABD, g./cc. | Av. C.S. lbs. | ABD, g./cc. | Av. C.S. lbs. |
| 66 | None | 50.0 | 121.9 | 50 | 70 | 0 | 100 | 0.73 | 16.0 | 0.79 | 25.0+ |
| 67 | 10.8 | 48.1 | 146.5 | None | 70 | 20 | 80 | 0.73 | 24.6+ | 0.74 | 25.9+ |
| 68 | 25.0 | 41.9 | 170.1 | 200 | 70 | 40 | 60 | 0.79 | 22.5+ | 0.81 | 22.2 |
| 69 | 35.6 | 26.6 | 162.0 | 300 | 70 | 60 | 40 | 0.83 | 24.5+ | 0.82 | 26.5+ |
| 70 | 47.6 | 13.3 | 162.0 | 400 | 70 | 80 | 20 | 0.86 | 24.8+ | 0.91 | 26.6+ |
| 71 | 59.5 | None | 162.0 | 500 | 70 | 100 | 0 | 0.93 | 6.4 | 0.95 | 9.5 |
| 72 | None | 67.5 | 105.8 | 75 | 60 | 0 | 100 | 0.60 | 20.5 | 0.69 | 26.8+ |
| 73 | 14.6 | 65.0 | 127.1 | 200 | 60 | 20 | 80 | 0.67 | 23.9+ | 0.72 | 24.9+ |
| 74 | 33.8 | 56.5 | 147.5 | 250 | 60 | 40 | 60 | 0.66 | 19.5 | 0.66 | 26.1+ |
| 75 | 48.1 | 35.8 | 140.2 | 400 | 60 | 60 | 40 | 0.67 | 25.2+ | 0.66 | 26.0+ |
| 76 | 64.4 | 17.95 | 140.9 | 600 | 60 | 80 | 20 | 0.81 | 23.1+ | 0.79 | 26.5+ |
| 77 | 80.4 | None | 140.5 | None | 60 | 100 | 0 | 0.70 | 10.3 | 0.71 | 16.4 |
| 81 | None | 62.5 | 261.3 | None | 80 | 0 | 100 | 0.72 | 7.3 | 0.67 | 25.4+ |
| 82 | 10.8 | 48.1 | 251.0 | 150 | 80 | 20 | 80 | 0.76 | 11.3 | | |
| 83 | 25.0 | 41.9 | 292.0 | 250 | 80 | 40 | 60 | 0.84 | 16.5 | | |
| 84 | 35.6 | 26.6 | 277.0 | 250 | 80 | 60 | 40 | 0.90 | 12.1 | | |
| 85 | 47.6 | 13.3 | 278.0 | 400 | 80 | 80 | 20 | 0.90 | 5.7 | | |
| 86 | 59.5 | None | 278.0 | None | 80 | 100 | 0 | Too soft | | Sticky | |
| 87 | None | 50.0 | 121.9 | 25 | 70 | 0 | 100 | 0.65 | 17.0 | | |

I claim as my invention:

1. A process for manufacturing a solid catalyst which comprises mixing from about 60 to about 80% by weight of a phosphoric acid and from about 20 to about 40% by weight of a mixture of solids comprising from about 80 to about 20% by weight of a siliceous adsorbent and from about 20 to about 80% by weight of a boron compound consisting of boric acid and its anhydride, drying the resultant composite at a temperature of from about 350° to about 500° F., and calcining the dried composite at a temperature of from about 500° to about 1000° F.

2. A process for manufacturing a solid catalyst which comprises mixing from about 60 to about 80% by weight of a phosphoric acid and from about 20 to about 40% by weight of a mixture of solids comprising from about 80 to about 20% by weight of a siliceous adsorbent and from about 20 to about 80% by weight of boric acid at a temperature of from about 70° to about 450° F. to form a composite, shaping said composite into particles, drying said particles at a temperature of from about 350° to about 500° F. and calcining the dried particles at a temperature of from about 500° to about 1000° F.

3. A process for manufacturing a solid catalyst which comprises mixing from about 60 to about 80% by weight of pyrophosphoric acid and from about 20 to about 40% by weight of a solid mixture comprising from about 80 to about 20% by weight of diatomaceous earth and from about 20 to about 80% by weight of boric acid at a temperature of from about 70° to about 450° F. to form a composite, shaping said composite into particles, drying said particles at a temperature of from about 350° to about 500° F. and calcining the dried particles at a temperature of from about 500° to about 1000° F.

4. A process for manufacturing a solid catalyst which comprises mixing from about 60 to about 80% by weight of a phosphoric acid and from about 20 to about 40% by weight of a mixture of solids comprising from about 80 to about 20% by weight of a siliceous adsorbent and from about 20 to about 80% by weight of boric anhydride, drying and calcining the resultant composite.

5. A process for manufacturing a solid catalyst which comprises mixing from about 60 to about 80% by weight of a phosphoric acid and from about 20 to about 40% by weight of a mixture of solids comprising from about 80 to about 20% by weight of a siliceous adsorbent and from about 20 to about 80% by weight of boric anhydride at a temperature of from about 70° to about 450° F. to form a composite, shaping said composite into particles, drying said particles at a temperature of from about 350° to about 500° F. and calcining the dried particles at a temperature of from about 500° to about 1000° F.

6. A process for manufacturing a solid catalyst which comprises mixing from about 60 to about 80% by weight of pyrophosphoric acid and from about 20 to about 40% by weight of a solid mixture comprising from about 80 to about 20% by weight of diatomaceous earth and from about 20 to about 80% by weight of boric anhydride at a temperature of from about 70° to about 450° F. to form a composite, shaping said composite into particles, drying said particles at a temperature of from about 350° to about 500° F. and calcining the dried particles at a temperature of from about 500° to about 1000° F.

7. A calcined mixture of from about 60 to about 80% by weight of a phosphoric acid and from about 20 to about 40% by weight of a solid comprising from about 80 to about 20% by weight of a siliceous adsorbent and from about 20 to about 80% of a compound selected from the members of the group consisting of boric acid and its anhydride.

8. The calcined mixture of claim 7 further characterized in that said siliceous adsorbent is diatomaceous earth.

JULIAN M. MAVITY.

REFERENCES CITED

The following references are of record in the file of this patent:

UNITED STATES PATENTS

| Number | Name | Date |
|---|---|---|
| 1,993,513 | Ipatieff | Mar. 5, 1935 |
| 2,018,065 | Ipatieff | Oct. 22, 1935 |
| 2,102,073 | Ipatieff et al. | Dec. 14, 1937 |
| 2,120,723 | Watson | June 14, 1938 |
| 2,126,282 | Rose | Aug. 9, 1938 |
| 2,164,500 | Cummins et al. | July 4, 1939 |
| 2,233,144 | Pinkerton et al. | Feb. 25, 1941 |
| 2,275,182 | Ipatieff et al. | Mar. 3, 1942 |
| 2,334,192 | Hanford | Nov. 16, 1943 |